Figure 1:
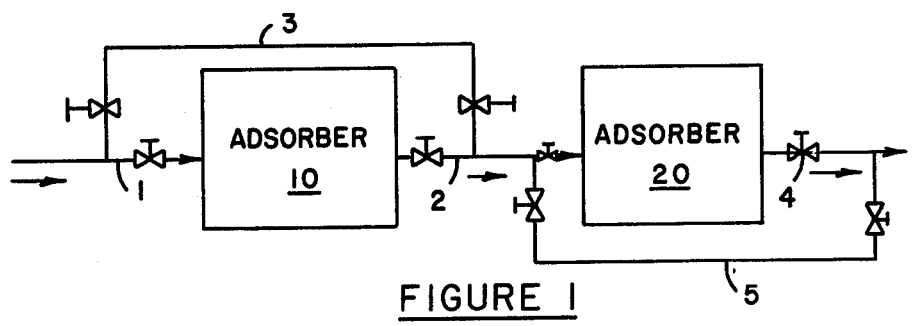

ial patent

United States Patent [19]
Brannon et al.

[11] 4,449,991
[45] May 22, 1984

[54] REMOVAL OF SULFUR FROM PROCESS STREAMS

[75] Inventors: Judeth H. Brannon; James J. Schorfheide, both of Baton Rouge, La.

[73] Assignee: Exxon Research and Engineering Co., Florham Park, N.J.

[21] Appl. No.: 451,102

[22] Filed: Dec. 20, 1982

[51] Int. Cl.³ .............................................. B01D 53/04
[52] U.S. Cl. ........................................... 55/73; 55/74; 210/681
[58] Field of Search .......................... 55/58, 62, 73, 74; 210/681

[56] References Cited

U.S. PATENT DOCUMENTS

| | | | |
|---|---|---|---|
| 2,384,311 | 9/1945 | Kearby | 260/677 |
| 2,551,905 | 5/1951 | Robinson | 23/2 |
| 3,085,380 | 4/1963 | Dillman et al. | 55/62 |
| 3,345,125 | 10/1967 | Kruel et al. | 55/73 X |
| 3,377,812 | 4/1968 | Garrett et al. | 55/62 X |
| 3,398,509 | 8/1968 | Tamura et al. | 55/73 |
| 3,451,196 | 6/1969 | Webster | 55/74 |
| 3,501,897 | 3/1970 | Van Helden et al. | 55/73 |
| 3,542,525 | 11/1970 | Pigford et al. | 55/62 X |
| 3,719,573 | 3/1973 | Kawahata | 55/62 X |
| 3,840,643 | 10/1974 | Martin | 55/73 X |
| 4,021,499 | 5/1977 | Bieser | 55/62 X |
| 4,025,321 | 5/1977 | Anderson et al. | 55/33 |
| 4,225,417 | 9/1980 | Nelson | 208/89 |
| 4,263,020 | 4/1981 | Eberly, Jr. | 55/73 X |
| 4,299,596 | 11/1981 | Benkmann | 55/62 X |
| 4,358,297 | 11/1982 | Eberly, Jr. | 55/62 |

Primary Examiner—Robert H. Spitzer
Attorney, Agent, or Firm—Llewellyn A. Proctor

[57] ABSTRACT

A process utilizing a sorbent in a manner which provides a greater and more efficient utilization of the sorbent for the removal of sulfur, or sulfur-containing compounds, from a process stream wherein a sulfur-containing process stream is passed through a fixed-bed of sorbent from one side of the bed to the opposite side, sulfur removed, and passage of the sulfur-containing process stream through said fixed-bed of sorbent continued to breakthrough of sulfur from the exit side of the bed. Then the direction of flow of the sulfur-containing process stream is reversed without desorption of the sulfur from the sorbent, and passage of the sulfur-containing process stream in said reverse direction through the bed again continued until breakthrough of sulfur from the side of the sorbent bed opposite the former entry side. In a preferred embodiment, two or more of the fixed-beds of sorbent are staged, or placed in series.

9 Claims, 4 Drawing Figures

REMOVAL OF SULFUR FROM PROCESS STREAMS

FIELD OF THE INVENTION

This invention relates to a process for the desulfurization of process streams, particularly the removal of sulfur from hydrocarbon feeds, especially naphtha feeds.

BACKGROUND OF THE INVENTION AND PRIOR ART

Sulfur occurs in many industrial processes, and sulfur, or sulfur containing compounds, for varying reasons must often be removed from process streams, e.g., flue gas, waste gas, or recycle gas streams. This has been accomplished, e.g., by contacting the sulfur-containing process stream with a sorbent, or adsorbent, comprising a particulate oxide, hydrate oxide, or hydroxide of alumina, zinc, iron, nickel, cobalt or the like, alone or in admixture with each other or with additional materials, e.g., alkali or alkaline earth metal oxides or the like. Reference is made, e.g., to U.S. Pat. No. 2,384,311 which discloses a hydrocarbon fraction entering a downpipe where it contacts a moving bed of an adsorbent, such as silica gel, to remove undesired compounds, e.g., $H_2S$, from the hydrocarbons. U.S. Pat. No. 2,551,905 discloses removing sulfur from gases or vaporized liquids, such as naphthas, by contacting the naphtha with a moving bed of pebbles. The pebbles decompose the sulfur compounds and then accept the sulfur. U.S. Pat. No. 3,085,380 discloses removing $H_2S$ from hydrocarbon gases by adsorption using serially connected adsorbent beds. Reference is also made to U.S. Pat. No. 3,398,509. This patent discloses removing sulfur dioxide from industrial gases by contact with a moving bed of carbon particles. U.S. Pat. No. 4,025,321 discloses removing impurities which could include sulfur from hydrocarbon streams, the hydrocarbon stream passing through several adsorbent beds, it being suggested that a purified hydrocarbon flows in a reverse direction through one of the beds for regeneration of the adsorbent. U.S. Pat. No. 4,225,417 discloses that a manganese-containing composition is a very effective adsorber of sulfur from hydrocarbon feedstocks. Bed profiles are given for various adsorbents. U.S. Pat. No. 4,263,020 discloses the use of various alumina spinels, notably zinc alumina spinel, as adsorbents for sulfur.

The quality of these various sorbents and others for the adsorption and removal of sulfur varies considerably, and in many applications it is necessary to scrub essentially all of the sulfur from the process streams. This is done for process reasons, as well as environmental reasons. Sulfur, for example, it a well known catalyst poison which finds its way into a process principally via the feed, and it can gradually accumulate upon and poison a catalyst. Essentially all petroleum feeds contain sulfur. Most of the sulfur, because of this adverse effect, is removed from the feed, typically by hydrodesulfurization. Additional sulfur removal can be achieved by passage of the hydrorefined (hydrofined) feed through a quard chamber or sulfur trap, e.g., by contact in a guard bed, or sulfur trap with a nickel or cobalt adsorbent.

Catalytic reforming, or hydroforming, a well-known and important process employed in the petroleum refining industry for improving the octane quality of naphthas and straight run gasolines, is illustrative of a process where the presence of sulfur can have a detrimental effect. In a typical reforming process, a series of reactors are provided with fixed-beds of sulfided catalyst which are sequentially contacted with a naphtha feed, and hydrogen, each reactor being provided with a preheater, or interstage heater, because the reactions which take place are endothermic. In the more recently developed process wherein poly-metallic platinum-containing catalysts (wherein one or more additional metals are added as promoters to the platinum) are used, it has in fact become essential to reduce the feed sulfur to only a few parts, per million parts by weight of feed (wppm), because of the sulfur sensitivity of these catalysts. For example, in the use of platinum-rhenium catalysts it is generally necessary to reduce the sulfur concentration of the feed naphtha well below about 10 wppm, and preferably well below about 2 wppm, to avoid excessive loss of catalyst activity and $C_5^+$ liquid yield.

The sulfur in such process must also be controlled at low levels in the hydrogen recycle stream to minimize sulfur contamination of the catalyst. The vapor effluent from the last reactor of the series is thus a gas rich in hydrogen, which can contain hydrogen chloride, chlorine, hydrogen sulfide, moisture, and small amounts of normally gaseous hydrocarbons. It is essential to separate hydrogen from the normally liquid $C_5^+$ product and recycle it to the process; and it is desirable to remove the sulfur from the recycle hydrogen gas stream.

In a guard chamber, or sulfur trap, which contains a fixed-bed of a sorbent, it is frequently found that a relatively high concentration of sulfur is adsorbed by the sorbent on the entry side of the bed, and conversely a relatively low concentration of sulfur is adsorbed by the sorbent on the exit side of the bed. In other words, of the weight percent sulfur distributed on the adsorbent of a bed used to trap sulfur, the percent sulfur distribution will vary in different sections to define a gradient of different sulfur concentrations. The entry side of the bed will contain by far the greatest amount of sulfur, and the exit side of the bed will contain the least. Sections of the bed between the entry side and exit side of the bed will contain sulfur concentrations of values intermediate those of the entry and exit side of the bed, but always with higher sulfur concentrations nearest the entry side of the bed. In one example, at the time of sulfur breakthrough, a condition defined as that point in time when on sulfiding the sorbent with a sulfur-containing process stream as much as 0.1 wppm sulfur appears and then increases in concentration within the exit stream, the sulfur bed profile, or graphical representation of this condition wt. % sulfur on the sorbent (represented on the ordinate) vs. percent distance through the bed (represented on the abscissa), has been found to rise sharply between, e.g., 20% of the total bed length and zero, which represents the entry side of the bed, and flattens out quite rapidly from e.g., 20% of the total bed length and 100% of the total bed length, which represents the exit side of the bed. Thus, a large portion of the bed remains unsaturated and the full sulfur sorption capacity of the adsorbent is not utilized.

Whereas many processes have provided varying degrees of success in the removal of sulfur from process streams, and some sorbents have greater sulfur removal capacity than others, more efficient utilization of the sorbent is also a worthwhile, and very desirable objective.

It is, accordingly, the primary object of the present invention to fill this need.

A specific object is to provide a new and improved process, particularly one utilizing a sorbent in a manner which provides a greater and more efficient utilization of the sorbent for the removal of sulfur, or sulfur-containing compounds, from a process stream.

A more specific object is to provide a process as characterized which utilizes a sorbent which removes sulfur compounds from gas, liquid, or mixed gas-liquid phase streams, in a more efficient manner.

A further object is to provide a process which utilizes a sorbent admirably suitable for selectively removing hydrogen sulfide and other sulfur compounds and contaminants in a more efficient manner from a recycle hydrogen stream, particularly a moisture bearing acidic recycle hydrogen stream as employed in a reforming operation.

These objects and others are achieved in accordance with the present invention embodying a process wherein a sulfur-containing process stream is passed through a fixed-bed of sorbent from one side of the bed to the opposite side, sulfur removed, and passage of the sulfur-containing process stream through said fixed-bed of sorbent contained to breakthrough of sulfur from the exit side of the bed at which time the direction of flow of the sulfur-containing process stream is reversed without desorption of the sulfur from the sorbent, and passage of the sulfur-containing process stream in said reverse direction through the bed again continued until breakthrough of sulfur from the former entry side, at which time the reverse flow of the sulfur-containing stream is discontinued and the sulfur-containing sorbent is regenerated, reactivated, or otherwise reconditioned while remaining in the containing vessel, or discharged and replaced with a fresh sorbent, or regenerated sorbent. When two or more of the fixed-beds of sorbent are staged, or placed in series, the sulfur-containing process stream is passed from a first fixed-bed of the series to the next, to contact the sorbent, sulfur is removed, and passage of the sulfur-containing process stream is continued up to the time of breakthrough of sulfur from the last fixed sorbent bed of the series, at which time the flow is diverted around the first bed, the sorbent in the first bed reconditioned or replaced, and direction of flow of the sulfur-containing process stream is interrupted, and reversed by the introduction of said stream into the last fixed-bed of the series, and the reverse flow of the process stream continued until breakthrough of sulfur from said former first sorbent bed of the series. It is found, pursuant to the practice of this invention, that greater utilization of a sorbent bed, or beds, for removal of the sulfur is realized; especially in staging the fixed sorbent beds, two sorbent beds in series being particularly preferred.

It is found in conventional guard chamber operation, that when breakthrough sulfur concentration is reached, a large portion of a fixed sorbent bed may not be saturated. Consequently, a simple, single-direction flow of a sulfur-containing process stream through a fixed-bed adsorber will not fully utilize the sorbent. The most effective utilization of the bed occurs when all of the sorbent is at its maximum sulfur capacity. By the practice of this invention, a single fixed-bed adsorber, or a staged adsorber system, can approach the efficiency of a moving bed of sorbent where a fresh sorbent is continuously added at an inlet and subtracted at an outlet. Staging requires a minimum of two fixed-beds in series, and two fixed-beds in series are preferred.

These and other embodiments of the invention will be better understood by reference to the following more detailed description of the process, and to the attached figures to which reference is made.

In the Figure:

FIG. 1 schematically depicts two fixed-bed adsorbers in series, each with a by-pass for change of adsorbents while the sulfur-containing process stream is diverted.

Figure 2:
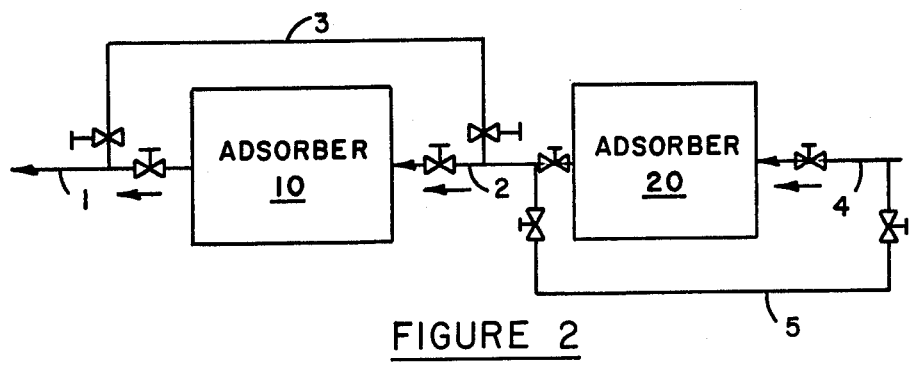

FIG. 2 schematically depicts the series of fixed-bed adsorbers of FIG. 1 with the direction of flow of the sulfur-containing process stream reversed.

Figure 3:
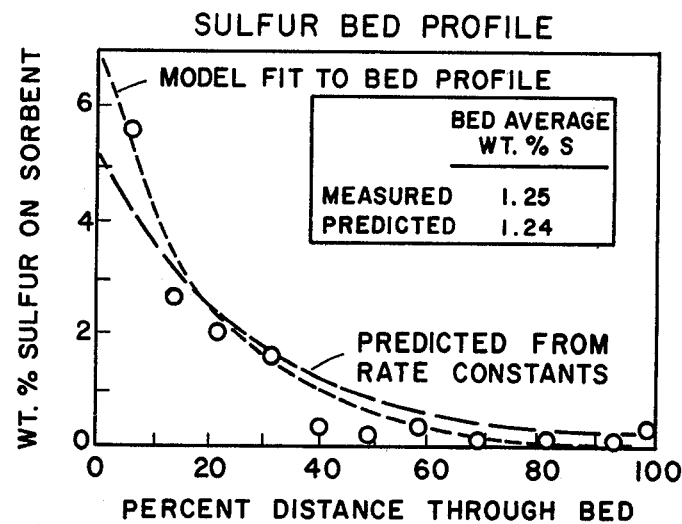

FIG. 3 graphically depicts a bed profile of the sulfur adsorbed by a single fixed-bed adsorber operated as described by reference to FIG. 1.

Figure 4:
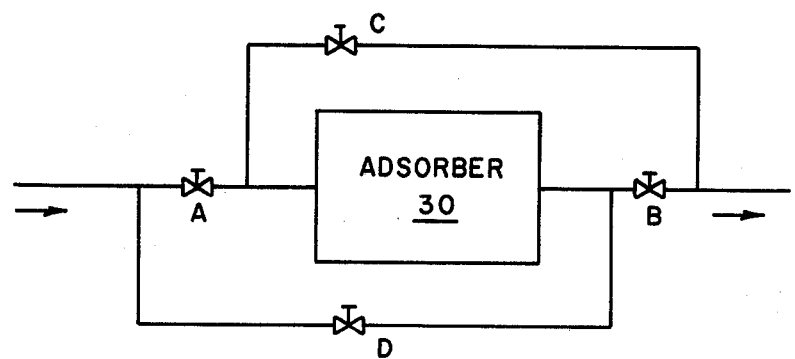

FIG. 4 schematically depicts a single fixed-bed adsorber wherein the direction of flow of the sulfur-containing stream is reversed after sulfur breakthrough from the exit side of the bed.

Referring to FIG. 1, a sulfur containing process stream, e.g., a sulfur-containing naphtha from a hydrofiner (not shown), is introduced via line 1 into fixed-bed adsorber 10 and, with by-pass lines 3, 5 closed, then passed from the exit or outlet side of adsorber 10 via line 2 into fixed-bed adsorber 20. Initially, both fixed-bed adsorbers contain essentially fresh or reactivated sorbent. The process stream is removed via line 4 from the exit or outlet side of fixed-bed adsorber 20 and employed, e.g., in a reforming unit. On the breakthrough of sulfur from fixed-bed adsorber 20, the flow of the sulfur-containing naphtha is diverted around fixed-bed adsorber 10, through by-pass line 3, while the sorbent in adsorber 10 is reconditioned, or discharged and replaced with fresh or reconditioned sorbent. Fixed-bed adsorber 10 is brought back into operation, and flow proceeds as depicted in FIG. 2. Thus, with by-pass lines 3, 5 closed, the sulfur-containing naphtha is passed via line 4 into fixed-bed adsorber 20, then passed via line 2 into fixed-bed adsorber 10, removed via line 1 and employed, e.g., in a reforming unit. On breakthrough of sulfur from fixed-bed adsorber 10, the flow of sulfur-containing naphtha is diverted via by-pass line 5 to permit change out or reconditioning of the sorbent of fixed-bed adsorber 20. The flow of sulfur-containing naphtha through adsorber 10 may be reversed at any convenient time between the diversion of flow through by-pass line 5 and the reintroduction of adsorber 20 to on-line operation, at which time flow through the system is once again as depicted in FIG. 1. The necessary valves, piping, and other auxiliary equipment required for sorbent regeneration or replacement have not been shown in FIGS. 1 and 2, as will be obvious to those skilled in the art.

FIG. 3 graphically depicts the percent sulfur distribution in different sections of a fixed bed adsorber, e.g., fixed-bed adsorber 10, throughout its total length, zero on the horizontal axis representing the boundary at the entry side of the fixed sorbent bed, and 100 representing the boundary at the exit side of the fixed sorbent bed. On the vertical axis there is represented the weight percent sulfur on the sorbent. A near-solid curve, and a dashed curve are depicted, the former representing sulfur distribution as predicted from sulfur removal rate data, and the latter from actual data fit to the sulfur bed profile. The box at the upper right corner of the graph gives the average weight percent sulfur on the sorbent in terms of the measured and predicted values. In either case, a relatively sharp sulfur bed profile is characteristic in the removal of sulfur from a sulfur-bearing process stream.

Utilization of a bed of nickel-on-alumina, nickel-on-diatomaceous earth, supported copper compounds, or other solid sorbent materials can be calculated from the sulfur bed profile. In one example using a nickel-containing sorbent, naphtha feed at 350° F. and 275 psig, e.g., for a 7 liquid-hourly-space-velocity and a feed sulfur concentration of 1 wppm sulfur, it is found that a single adsorber will have 28% of the bed utilized when a breakthrough concentration of 0.1 wppm sulfur in the product is reached, where utilization is understood to mean the percentage of maximum sulfur capacity attainable at the process conditions employed. In conventional operation, at this point, the sorbent is necessarily changed or regenerated. For two fixed-bed adsorbers in series at the same time the combination of the two beds have 28% overall utilization, the first adsorber of the series will have 42% bed utilization and the second adsorber 14%. At breakthrough, the catalyst in the first reactor would be reconditioned or changed and flow switched as shown in FIGS. 1 and 2. After, e.g., the second breakthrough concentration of 0.1 wppm S is reached, the second adsorber will have about 56% of the bed utilized and about 14% of the first adsorber bed utilized. The sorbent in the second adsorber can be changed when about 56% of the bed has been utilized. This is about twice the amount of sulfur the single adsorber system would have when it would be changed at sulfur breakthrough. For a moving bed adsorber system, 61% of the bed will be utilized at breakthrough. Thus, a two adsorber system with reversing flow will approach the bed utilization of a moving bed system. This example, summarized in the Table, shows how maximum utilization of a sulfur trap can be attained where a sharp bed profile exists.

TABLE

| Adsorber System | Approximate Bed Utilization for Various Adsorber Systems[1] | |
| --- | --- | --- |
| | When 1st Breakthrough Is Reached | When 2nd Breakthrough Is Reached |
| Single-Pass | 28 | |
| Two-Stage, Reversing: | | |
| First Adsorber | 42 | 14 |
| Second Adsorber | 14 | 56 |
| Moving Bed | 61 | |

[1] These values will change for different space velocities and feed sulfur concentrations, but the relationships of the different systems will remain the same.

In the example illustrated by the table, it is thus shown that the two-stage reversing process enables each adsorber bed to be used until about 56% utilization has been achieved. Each time breakthrough occurs, the second bed in the process flow has only attained 14% utilization. Flow is continued through this bed while the adsorbent in the other bed is either regenerated, replaced, or otherwise reconditioned. When this reconditioned bed is brought back on line, the two beds operate in series, with flow through the system in the direction opposite to what it had previously been, until breakthrough occurs at the outlet of the last bed. At this point, the bed which earlier had a 14% utilization, in the downstream position, now has about 56% utilization, in the upstream position, and is ready for reconditioning or replacement. The other bed, which has only attained 14% utilization, in the downstream position, undergoes a reversal of flow while the upstream bed is reconditioned, and the cycle of (1) series operation until sulfur breakthrough, (2) flow diversion, bed reconditioning, and flow reversal, and (3) a return to series operation, is repeated. Thus, each bed is utilized to the extent of approximately 56%, or roughly twice what would be achieved in a single-bed, single-pass type of adsorber.

A simplified method by which this invention can be practiced is with a single fixed-bed adsorber, reversing the direction of flow through the bed once breakthrough has occurred at the bed outlet, or sooner. The piping and valves needed to control the direction of flow are shown by reference to FIG. 4.

Initially, in accordance with FIG. 4 flow is through valve A, the fixed-bed adsorber 30, and valve B, with valves C and D closed. The direction of flow is reversed when valves A and B are closed and valves B and C are open.

Obviously, this type of flow-reversing operation requires that the sulfur removed from the process stream in one direction not be returned to the stream during reversed flow. This is normally not a problem unless sorbents are employed wherein adsorption is readily reversible. However, such undesirable removal of previously adsorbed materials can sometimes be avoided by lowering the temperature during the reversed-flow portion of the cycle, in either all or a portion of the sulfur removal bed, or beds.

It is apparent that various modifications and changes can be made without departing from the spirit and scope of the invention. The conditions of operation of the beds, e.g., temperature and pressure, typically depend on the nature of the specific sorbent used, the application, economics, needs and constraints of the total process with which the guard beds must be compatible. Generally temperatures range from ambient to about 1000° F., with pressure ranging from atmospheric to about 100 atmospheres. Space velocities typically depend on sulfur concentration, and the nature of the feed stream being processed, e.g., whether gas, liquid, or mixed phase. Typically a liquid process stream is passed through a sorbent at from about 1 to about 20 LHSV.

Having described the invention, what is claimed is:

1. In a process for the removal of sulfur from a sulfur-containing process-stream wherein said sulfur-containing process stream is passed through a fixed bed of sorbent, sulfur removed on said sorbent, and passage of said sulfur-containing process stream through said fixed bed of sorbent continued until breakthrough of sulfur from the exit side of said fixed bed of sorbent
   the improvement comprising
   discontinuing, and reversing without desorption of the sulfur from the sorbent the direction of flow of the sulfur-containing process stream through said fixed-bed of sorbent, and further removing sulfur on said sorbent until breakthrough of sulfur from the former entry side of the sorbent.

2. The process of claim 1 wherein two or more fixed-beds of sorbent are placed in series, the sulfur-containing process stream passed from a first fixed-bed of the series to the next, sulfur removed, and passage of the sulfur-containing process stream continued up to the time of breakthrough of sulfur from the last fixed sorbent bed of the series, at which time the direction of flow of the sulfur-containing process stream is interrupted and reversed by the introduction of said sulfur-containing process stream into the last fixed-bed of the series, and the reverse flow of the process stream continued until breakthrough of sulfur from said former first sorbent bed of the series.

3. The process of claim 2 wherein two fixed beds of sorbent are placed in series.

4. The process of claim 1 wherein the sulfur-containing process stream is a liquid or mixed liquid gas phase stream.

5. The process of claim 1 wherein the sulfur-containing process stream is a mositure-bearing acidic recycle hydrogen stream as employed in a reforming operation.

6. The process of claim 1 wherein the sorbent contains at least one component selected from the group consisting of nickel, copper, zinc, manganese, iron, cobalt, chromium, tungsten and the like.

7. The process of claim 1 wherein the sorbent is comprised of a zinc alumina spinel.

8. The process of claim 1 wherein the sorbent is comprised of nickel.

9. The process of claim 1 wherein two fixed-beds of sorbent are placed in series, the sulfur-containing process stream is passed from the first fixed-bed of the series to the second, sulfur is removed from the process stream, and passage of the sulfur containing process stream is continued up to the time of breakthrough of sulfur from the second fixed sorbent bed of the series, at which time the flow is diverted around the first fixed-bed and the sorbent in the first fixed-bed is regenerated, replaced, or reconditioned, then the direction of flow of the sulfur-containing process stream is interrupted and reversed by the introduction of said sulfur-containing process stream into the second fixed-bed of the series, and the reverse flow of the process stream continued until breakthrough of sulfur from said former first sorbent bed of the series; the cycle of breakthrough, diversion around the leading bed, regeneration, replacement, or reconditioning of the sorbent in the leading bed, and reversal of flow into the former last fixed-bed and then the former leading bed being continued during processing of the sulfur-containing stream.

* * * * *